E. V. Fassmann.

Cotton Bale Tie.

No. 2,417. Reissued Dec. 11, 1866.

Witnesses
C. L. Topliff
Theo Tusch

Inventor:
E. V. Fassmann
per Munn & Co
Attys

UNITED STATES PATENT OFFICE.

E. VICTOR FASSMANN, OF NEW ORLEANS, LOUISIANA.

IMPROVEMENT IN HOOP-LOCKS FOR COTTON-BALES.

Specification forming part of Letters Patent No. 47,288, dated April 18, 1865; Reissue No. 2,417, dated December 11, 1866.

*To all whom it may concern:*

Be it known that I, E. VICTOR FASSMANN, of New Orleans, in the parish of Orleans and State of Louisiana, have invented a new and Improved Cotton-Bale Tie or Hoop-Lock; and I do hereby declare that the following is a full, clear, and exact description thereof, which will enable those skilled in the art to make and use the same, reference being had to the accompanying drawings, forming a part of this specification, in which—

Figure 1:
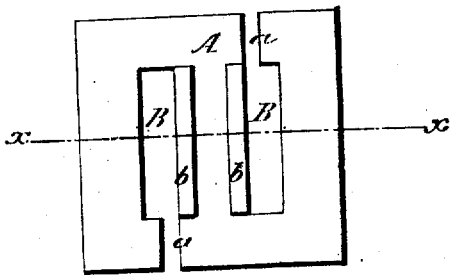
Figure 2:
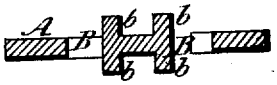
Figure 3:
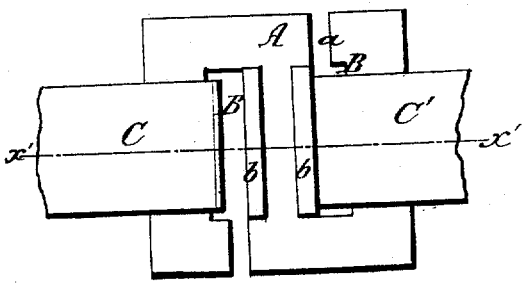
Figure 4:
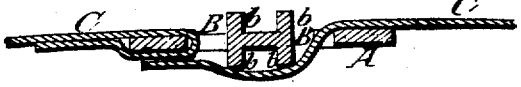

Figure 1 is a detached side view of my invention; Fig. 2, a section of the same, taken in the line *x x;* Fig. 3, a side view of the same with the ends of the hoop attached; Fig. 4, a section of Fig. 3, taken in the line *x′ x′*.

Similar letters of reference indicate corresponding parts.

This invention relates to a new and improved fastening for securing iron hoops on cotton bales previous to the removal of the latter from the press, and which fastenings are commonly termed "cotton-bale ties" or "hoop-locks."

The object of the invention is to obtain a tie or lock for the purpose specified which may be cheaply manufactured, admit of having the ends of the hoops readily applied or attached to it to secure the hoops on the bales, and which will admit of the hoops being applied to bales varying in size or dimensions.

A represents a plate, which may be of cast or wrought iron, and of square or other form. This plate has two slots or openings, B B, in it rather greater in length than the width of the hoop. These slots or openings have each a slit, *a*, at one end, said slits extending out to the edge of the plate A, at opposite sides thereof, as shown in Figs. 1 and 3. The plate A is cast or otherwise formed with one or two ridges or projections, *b b*, at one or both sides and at the inner edge of each slot or opening B. The plate A may be about one-eighth (⅛) of an inch thick, and the ridges or projections *b b* may extend out from the plate about one-eighth (⅛) of an inch or more.

C C′ represent the two ends of a hoop, one end, C, being fitted in one of the slots B, and bent around so as to be securely fastened in it, as shown at *c* in Fig. 4. The other end, C′, of the hoop is straight, and when the bale is under compression the straight end is inserted in the other slot, B, and pressed through, so that the hoop may be snugly adjusted to the bale. When the bale is released from pressure, the ridges or projections *b b* sink into the end C′ of the hoop and firmly hold the same, the elasticity of the cotton being sufficient to effect this end. The slits *a* facilitate the insertion of the ends C C′ of the hoop in the plate A; but they are not indispensably necessary. The ridges or projections *b b* are designed to be on both sides of the plate A, so that either side of the same may be placed against the bale, and therefore obviate much handing or manipulation, which would otherwise occur if the ridges were only on one side. The hoops also may be adjusted to bales of different sizes, which is a great advantage, as the bales will always vary materially in size, and great trouble and embarrassment are experienced with those ties or locks which are used with holes or notches made in the ends of the hoops, as the latter can only be fastened at certain points.

I claim as new and desire to secure to secure by Letters Patent—

The plate provided with slots, when the same is constructed with ridges or projections on both sides of the plate, substantially as set forth.

E. VICTOR FASSMANN.

Witnesses:

J. P. WADDELL,

W. B. PHILLIPS.